United States Patent
Blakely et al.

(10) Patent No.: US 9,584,440 B1
(45) Date of Patent: Feb. 28, 2017

(54) REAL-TIME DISTRIBUTED TREE

(71) Applicant: XIRSYS LLC, Valencia, CA (US)

(72) Inventors: Richard Blakely, Valencia, CA (US); Ritchie Turner, La Reina (CL)

(73) Assignee: XIRSYS LLC, Valencia, CA (US)

( * ) Notice: Subject to any disclaimer, the term of this patent is extended or adjusted under 35 U.S.C. 154(b) by 0 days.

(21) Appl. No.: 14/880,990

(22) Filed: Oct. 12, 2015

(51) Int. Cl.
*G06F 15/173* (2006.01)
*H04L 12/911* (2013.01)
*H04L 29/08* (2006.01)
*H04W 4/00* (2009.01)
*G06F 9/455* (2006.01)

(52) U.S. Cl.
CPC ............ *H04L 47/782* (2013.01); *H04L 67/18* (2013.01); *H04L 67/22* (2013.01); *G06F 9/45558* (2013.01); *H04L 67/02* (2013.01); *H04L 67/10* (2013.01); *H04W 4/001* (2013.01); *H04W 4/005* (2013.01)

(58) Field of Classification Search
CPC ......... H04L 67/10; H04L 67/02; H04L 67/16; H04L 67/34; H04W 4/001; H04W 4/005
See application file for complete search history.

(56) References Cited

U.S. PATENT DOCUMENTS

| | | | |
|---|---|---|---|
| 8,261,295 B1* | 9/2012 | Risbood | G06F 8/61 717/177 |
| 2007/0019622 A1* | 1/2007 | Alt | H04L 29/06027 370/352 |
| 2015/0350326 A1* | 12/2015 | Shetty | H04L 67/1095 707/825 |
| 2016/0088049 A1* | 3/2016 | Seed | G06F 9/541 709/203 |
| 2016/0092348 A1* | 3/2016 | Straub | G06F 11/3684 717/124 |

* cited by examiner

*Primary Examiner* — Tom Y Chang
(74) *Attorney, Agent, or Firm* — Los Angeles Patent Group; Arman Katiraei

(57) ABSTRACT

Some embodiments provide a real-time distributed tree (RDT) comprising scalability, protocol, and data layers for dynamically and in real-time defining and implementing customer applications over cloud operator resources. The RDT is a tree structure with customer branches comprising nodes hierarchically organizing domains, domain applications, and application rooms. Service layer service nodes can be linked to any customer branch node. Linking service nodes to the customer node reserves services represented by the service nodes for allocation to or scaling of any customer application or room under that customer branch. Linking service nodes to an application node or room node allocates the corresponding services to the application or room. The RDT moves linkages to maximize service usage and minimize wasted allocation. Protocol layer nodes modify signaling or messaging of the services implementing a customer application. Data layer nodes provide customizable four-dimensional storage of activity occurring anywhere in the customer branch.

19 Claims, 12 Drawing Sheets
REAL-TIME DISTRIBUTED TREE

BACKGROUND ART

Much of today's digital content and services are consumed and delivered from the "cloud". Generally, the cloud refers to a distributed platform whose architecture and resources are operated and managed by one entity. Different customers leverage and rely on these resources to execute and deliver their applications to end users located throughout the world. By leveraging the cloud, application providing customers can direct their focus to content and application creation, rather than building and managing the infrastructure to serve the content and applications to end users.

Cloud operators include content delivery networks (CDNs), hosting providers, or any operator operating multiple servers at different geographic locations for purposes of serving content and services of others. Akamai and Amazon Web Services are examples of some cloud operators. Together, the cloud operators create a virtually unlimited resource pool from which application providers can reach end users.

The problem with cloud usage is the manual or human administrative and configuration overhead required to deploy applications thereon. This problem is evident in applications that are active for short periods of time and that can experience widely fluctuating demand. For example, web real-time communication (WebRTC) applications include live streaming events, chat and other communication sessions, online meetings, and other online collaborations. These applications are relatively brief in length and can experience unexpected or large spikes in demand over that brief interval. These applications require rapid allocation and deallocation of resources, service configuration and customization, and attention to scaling. Such operations are normally beyond the automated functions of current cloud operators, whereby cloud operators primarily deploy machines for customers to use and leave much of the configuration and customization of the machines up to the customers. As a result, these applications can reintroduce much of the infrastructural overhead that the cloud was intended to remove and free application providers from.

Accordingly, there is a need to simplify the deployment of WebRTC and other applications on the cloud. To this end, there is need to obfuscate the allocation and scaling of the underlying services and resources on which the applications are implemented. There is further a need to automate the allocation and scaling of such services and resources with the automation occurring dynamically and in real-time.

BRIEF DESCRIPTION OF THE DRAWINGS

A preferred embodiment of methods and systems for a real-time distributed tree will now be described, by way of example only, with reference to the accompanying drawings in which.

DETAILED DESCRIPTION

I. Overview

Figure 1:
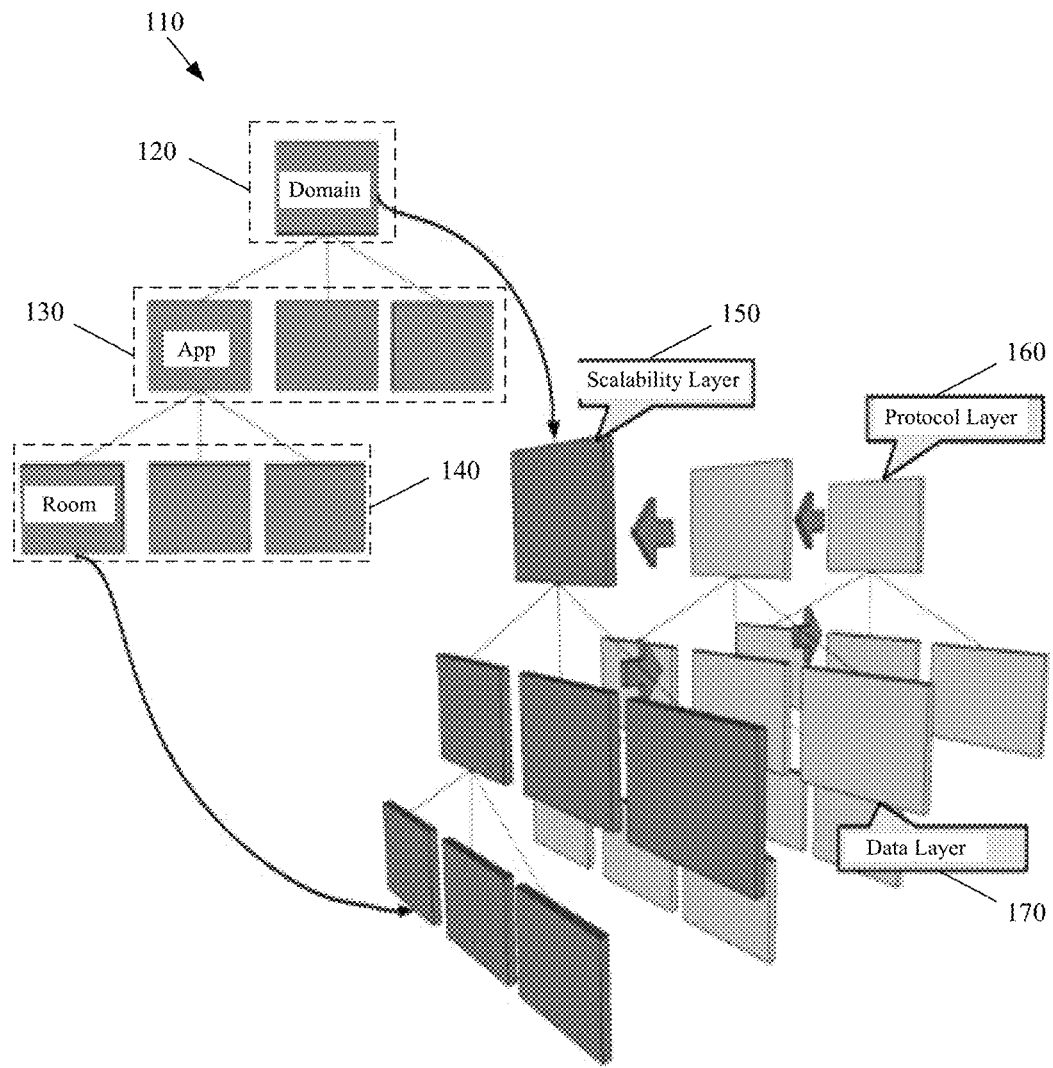
FIG. 1 conceptually illustrates the multi-layer RDT in accordance with some embodiments.

Some embodiments provide a real-time distributed tree (RDT) offering different services that can be used to implement different customer applications over cloud operator resources managed by the RDT. The RDT automatically, dynamically, and in real-time deploys, allocates, and scales the services and resources needed to implement the different customer applications on behalf of the RDT customers, thereby freeing the customers from manually managing the infrastructure needed for the distribution of their applications. Furthermore, the RDT greatly simplifies the deployment of those applications by providing the means with which customers can rapidly and easily configure, customize, and scale the services that execute the features and functionality of the applications on the cloud operator resources.

In some embodiments, the RDT coalesces resources of one or more cloud operators. This provides the RDT with a virtually unlimited pool of resources onto which the RDT seamlessly, transparently, and automatically deploys services for the implementation of different customer applications. This coalescing of resources also allows the RDT to optimize customer applications by providing a geographically targeted deployment of the services.

The RDT is a tree structure comprising first tier identifiers hierarchically organizing different customers or customer domains, second tier identifiers hierarchically organizing different customer applications, and third tier identifiers hierarchically organizing different application instances, also referred to as application rooms. Different scalability, protocol, and data layers are then linked to the tree and relinked about the various nodes at the first, second, and third hierarchically tiers to dynamically define the allocation of services, protocols, storage, and other configurations and customizations.

The RDT scalability layer is comprised of different services nodes representing different services that can be used in implementing customer applications. Linking a service node to an RDT node allocates the service represented by the service node and the resources needed to execute the service to the corresponding customer/domain, customer application, or application room identified by the RDT node. The linkages between the RDT and the scalability layer provide simply and efficient means by which the RDT can deallocate, reallocate, or scale a service as demand changes and services are onboarded and offboarded.

In some embodiments, the protocol layers define the signaling and messaging that occurs between the services used to implement a common customer application. The protocol layers establish inter-service dependencies and facilitate the scaling of a particular service used to implement a specific customer application. In some embodiments, the protocol layers link users of a customer application directly or indirectly to various services implementing the customer application. Here, the protocol layers define the signaling and messaging with which services and users of the customer application communicate and can thereby define the means by which customers access or engage with a service used in implementing a customer application. In some embodiments, the protocol layers link the customer application and/or the services implementing the application to the data layer. Here, the protocol layers are used to track service activity occurring anywhere within the RDT.

In some embodiments, the data layers provide four-dimensional storage to compliment the RDT, and more specifically, to any node thereof. By leveraging the data storage capabilities, customers can track any application or service related activity throughout the service duration. The storage is non-destructive. In some embodiments, the four-dimensional storage tracks and organizes activity across path, key, layer, and time dimensions. This provides for an organized hierarchical storage of the activity, as well as, efficient and simple retrieval of the activity when needed.

FIG. 1 conceptually illustrates the multi-layer RDT in accordance with some embodiments. The figure illustrates a tree 110 with different branches stemming from the tree root. The branches include different nodes. The nodes include first tier nodes 120, second tier nodes 130, and third tier nodes 140. The RDT links nodes from a service layer 150, a protocol layer 160, and a data layer 170 to the various first tier nodes 120, second tier nodes 130, and third tier nodes 140 in defining the allocation, deallocation, and scaling of services and resources, service signaling and messaging, and storage for the domains, domain applications, and application rooms of the different customers or application providers relying on the RDT for the deployment of their applications to end users.

The first tier nodes 120 represent application provider or customer domains. Applications that are reachable through the identified domains (and defined by the second tier nodes 130) rely on the RDT for automatic deployment, allocation, and scaling using RDT services and cloud operator resources managed by the RDT. It should be noted that a particular application provider or customer can place multiple domains under RDT control with each domain creating a new first tier node 120 in the RDT.

The second tier nodes 130 identify applications that are defined by the application providers or customers under each domain. The second tier nodes 130 represent the applications that the RDT is tasked with implementing via automated service and resource allocation and scaling.

The third tier 140 identify the application rooms. Each room represents a different instance of an application. For example, a customer can define a chat application at the second tier of the RDT and the chat application can have different rooms representing different running instances of the application with each room having a different set of users participating in a different chat session.

The service layer 150 nodes linked to a first tier node 120 represent the various services that the RDT has dedicated for implementing any of the applications defined under the corresponding customer domain. These services can be reallocated to different applications or application rooms defined under the customer domain as they are needed.

The service layer 150 nodes linked to a second tier node 130 identify the services that the RDT has allocated and are in use in implementing a particular customer application represented by the corresponding second tier node 130. Should demand or usage of the allocated services exceed the allocated set of services, the RDT automatically scales the service set by allocating additional services from the reserved set of services identified at the parent first tier node, wherein the allocation of additional services is in response to the RDT linking additional service layer nodes to the second tier node 130 of the corresponding particular customer application.

The protocol layer 160 nodes define signaling and messaging for the customer applications and services implementing those applications. The protocol layer 160 nodes can also establish communication between a service identified by a service node and the storage layer such that some or specific activity resulting from the service execution is tracked and recorded to storage. The data layer 170 nodes track and record various service and application activity across the different dimensions according to a four-dimensional storage of some embodiments.

II. RDT Service Layer

The RDT service layer manages service allocation to different domains, customer applications, and application rooms. The allocated services are identified by service nodes that have been linked to the corresponding RDT first tier, second tier, and third tier nodes.

The RDT has an ever-changing and dynamic form as customers add or modify tree branches and as the RDT links and relinks service nodes about the nodes of the tree branches. With each such linking, the RDT reallocates and scales services and the corresponding resources between applications of the same or different domains in real-time and in a geographically targeted manner as the services are needed. To determine where services are needed and where they are no longer needed, the RDT monitors usage of each linked service node. In doing so, the RDT manages service scaling and reallocation with little to no manual effort on the part of the customers.

Before a customer can request services from the RDT, the customer creates its own branch in the RDT. The initial tier or first node in the customer branch provides some unique identifier. In some embodiments, the unique identifier is a customer domain. The domain identifies the application provider or customer controlling the domain. In the second tier, the customer creates application nodes identifying applications the customer implements using one or more of the RDT services executing over cloud operator resources. These applications are accessible from the domain identified as the first tier node from which the corresponding application second tier node branches off of. In the third tier and branching from any particular application node, the customer creates application rooms. As noted above, each room represents a different instance of an application. In some embodiments, a customer can create different rooms to restrict which users can participate or access specific instances of an application.

The discussion above relating the first tier nodes to domains, the second tier nodes to customer applications, and the third tier nodes to application rooms is provided as preferred embodiments of the RDT. However, the nodes need not be restricted only to such uses and implementations. The nodes can be containers of any kind to which different RDT services, protocols, and data storage from the different layers can be linked. In other words, the RDT services, protocols, data storage, and resources of different cloud operators under RDT control can be used to dynamically implement and scale any solution, feature, or functionality for a customer.

Figure 2:
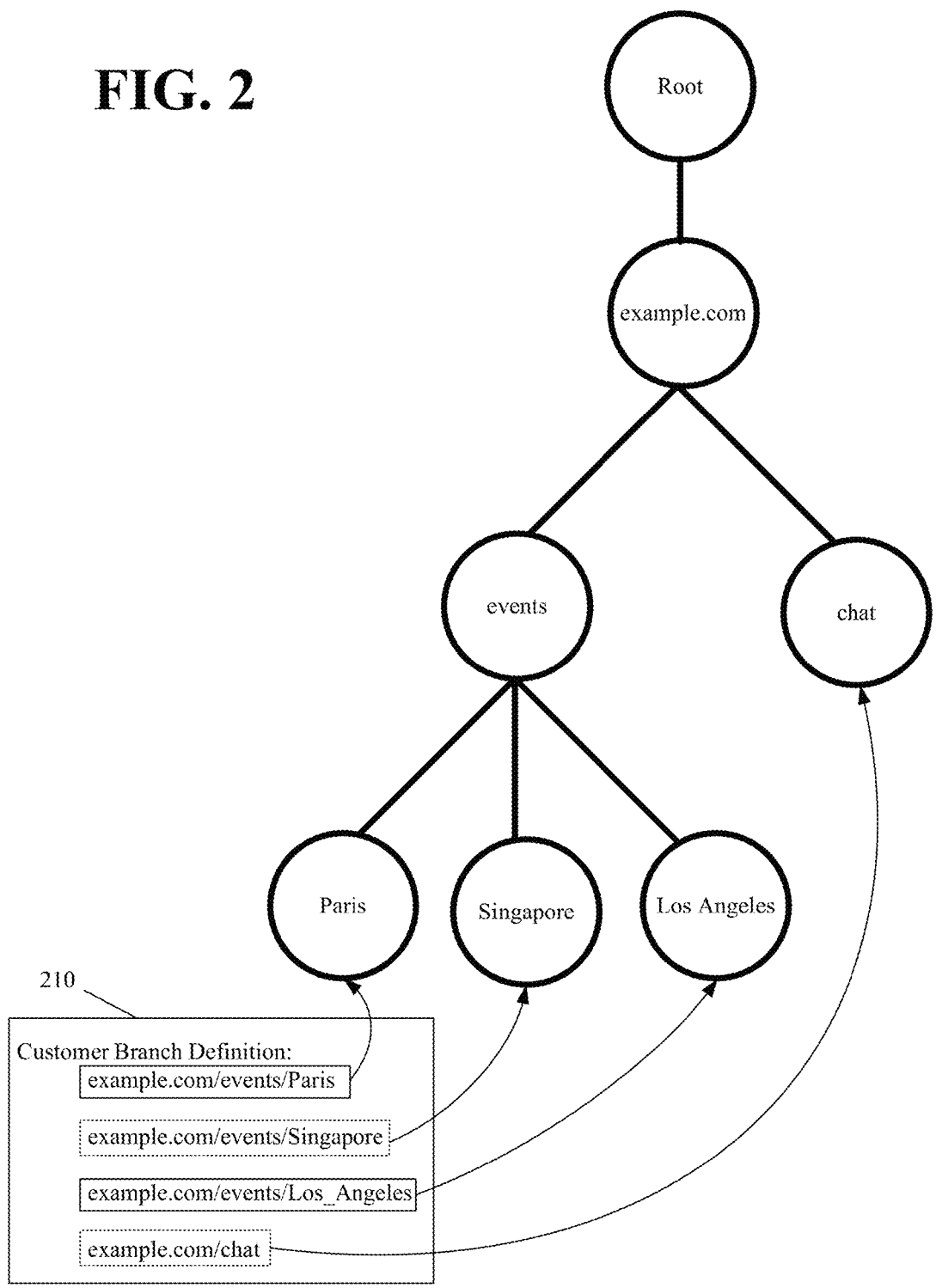
FIG. 2 conceptually illustrates creating a branch in the RDT in accordance with some embodiments.

FIG. 2 conceptually illustrates creating a branch in the RDT in accordance with some embodiments. Using an online interface or other dashboard 210, a customer defines a branch according to a set of Uniform Resource Locators (URLs) or directory paths.

In this figure, the customer branch first tier specifies "example.com". The customer branch second tier specifies two applications entitled "events" and "chat". The customer branch third tier specifies rooms "Paris", "Singapore", and "Los Angeles" for the "events" application. The "events" application can be representative of a live stream that is broadcast to users in three different regions or can alternatively represent three different live streams, while the "chat" application can be representative of a chat room in which users can communicate with one another.

Figure 3:
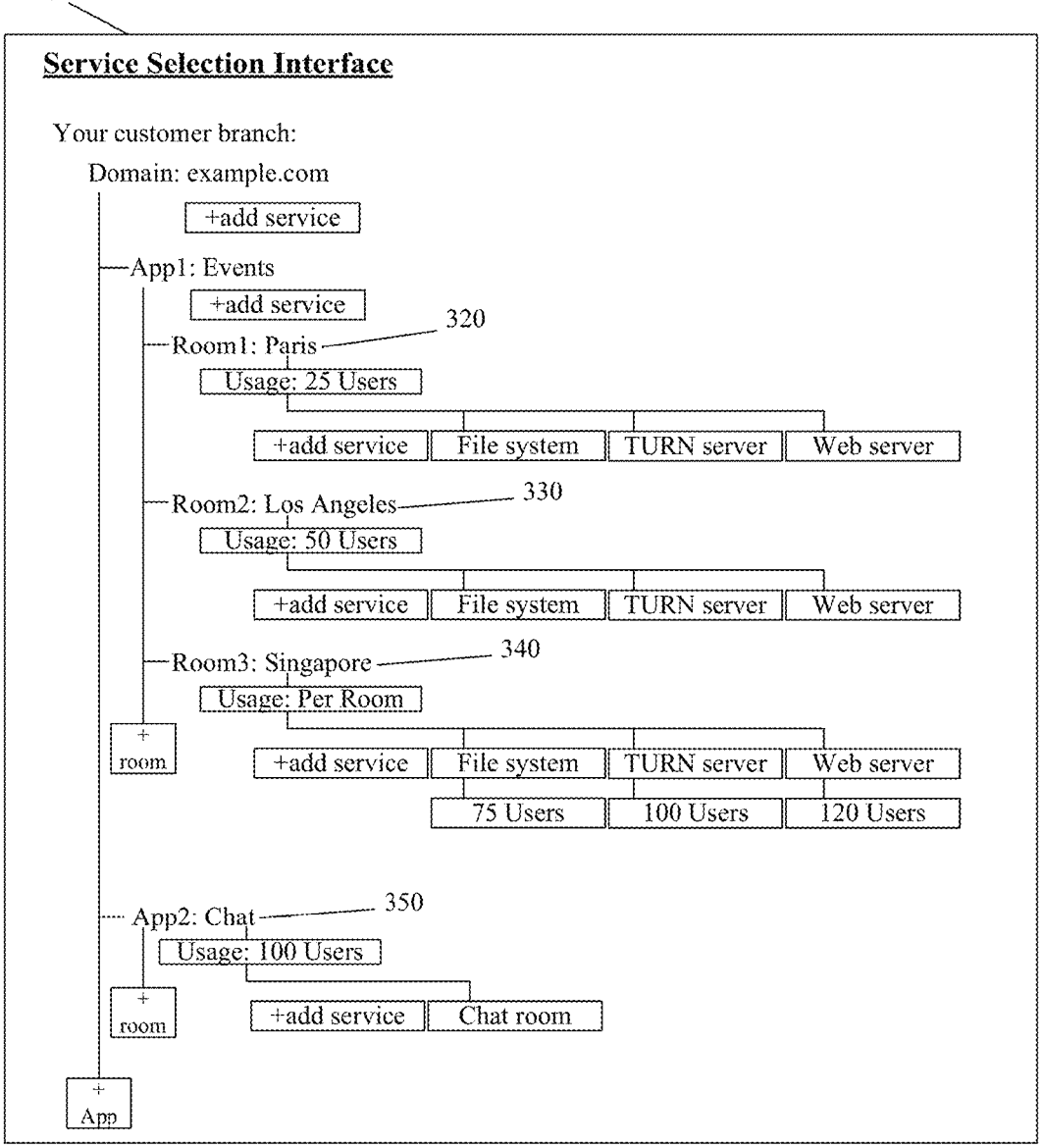
FIG. 3 illustrates a first manner in accordance with some embodiments for requesting services under the RDT customer branch of FIG. 2.
Figure 5:
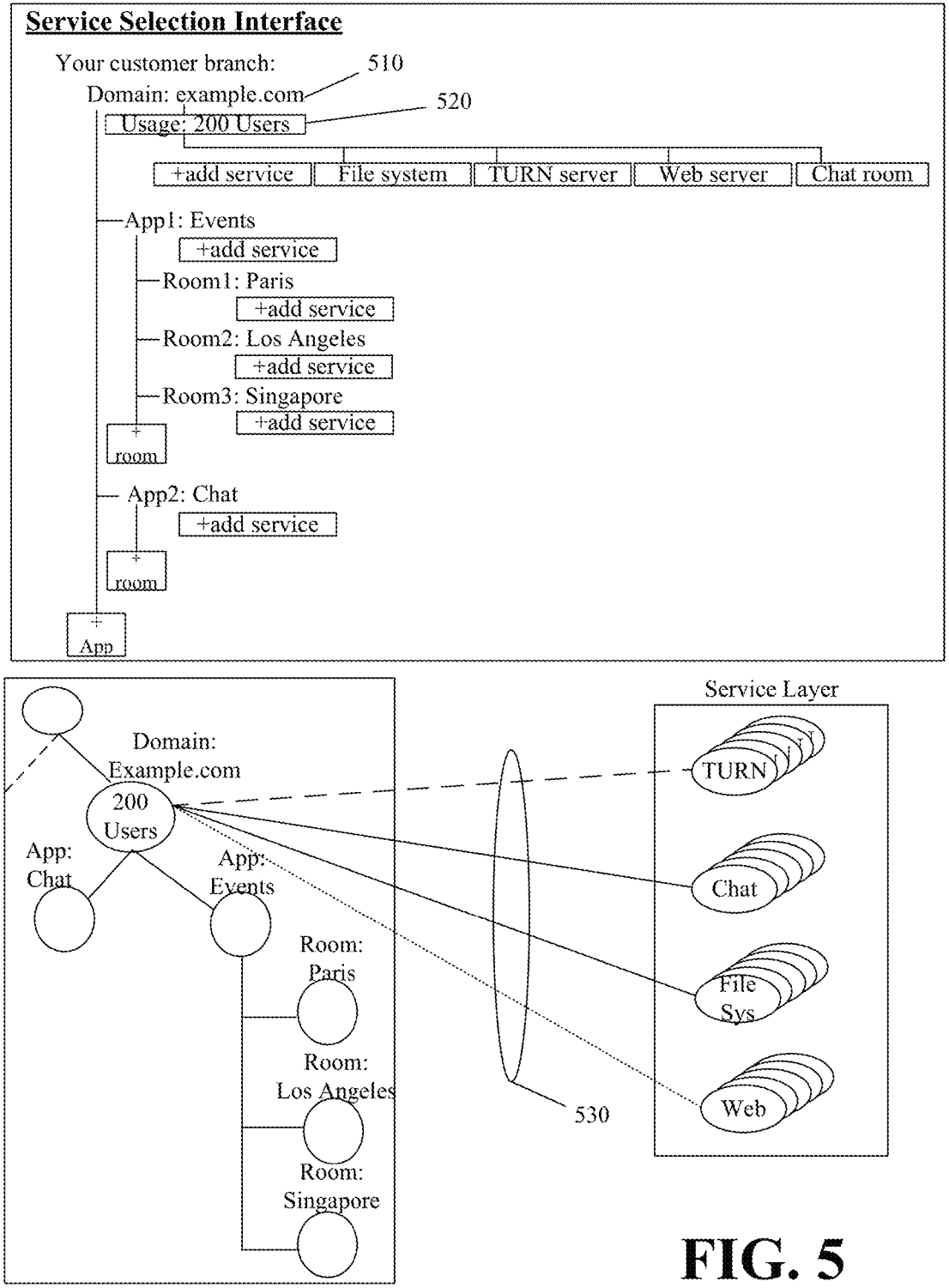
FIG. 5 illustrates a second manner in accordance with some embodiments for requesting services under the RDT customer branch.

Once a customer creates a branch, the customer requests services from the RDT in order to implement the various applications and application rooms defined therein. FIG. 3 illustrates a first manner in accordance with some embodiments for requesting services under the RDT customer branch of FIG. 2. FIG. 5 illustrates a second manner in accordance with some embodiments for requesting services under the RDT customer branch. In both figures, an online interface or other dashboard is used in requesting services.

FIG. 3 illustrates an exemplary interface or dashboard 310 with which a customer requests different services for implementing its applications. Although not illustrated in the figure, a customer could alternatively request services using an application programming interface (API), scripting interface, or other command drive interface.

Using the interface or dashboard 310, the customer requests services individually for each created room 320, 330, and 340. For each of the application rooms 320, 330, and 340, the customer request granularly identifies different services for instantiating the overall customer application instance for that room. Specifically, the customer requests a separate file system service, a TURN server service, and a web server service for implementing the application instance for each room 320, 330, and 340. The customer can then build or customize its application atop these RDT services using its own code, scripts, APIs, or interface as some examples. These are examples of some granular services that a customer can request from the RDT. The customer also requests an all-encompassing service, such as a chat session service for implementing application 350. Requesting such an all-encompassing service automatically instantiates different underlying services that are linked to and needed to implement the chat session service. For example, the chat session service may require a STUN server and signaling server for its implementation with the RDT automatically including these sub-services as part of the all-encompassing chat session service. Here again, the customer could customize the application (i.e., chat session service) by configuring the service or by deploying its own code, scripts, APIs, or interfaces to run atop the RDT service.

In requesting RDT services, the customer further identifies an expected usage. In some embodiments, the expected usage is defined for the application or room for which services are requested. In some such embodiments, the customer identified expected usage applies to all services requested for the application or room. In some other embodiments, the customer defines the expected usage for each requested service individually. In FIG. 3, the customer defines expected usage for rooms 320 and 330, but defines expected usage for each service of room 340 individually. The expected usage is defined in terms of a number of users that are expected to access or otherwise participate. More sophisticated users could define expected usage in terms of expected load or resource utilization.

The RDT uses the customer identified expected usage in order to determine the quantity of the requested services to allocate to each room or application. A set of heuristics convert the expected usage to a quantity of the requested services for handling the anticipated load in each room. For each allocated service instance that is allocated to an application room, the RDT links a corresponding service node representing the allocated service instance to the room node identifying the application room.

Figure 4:
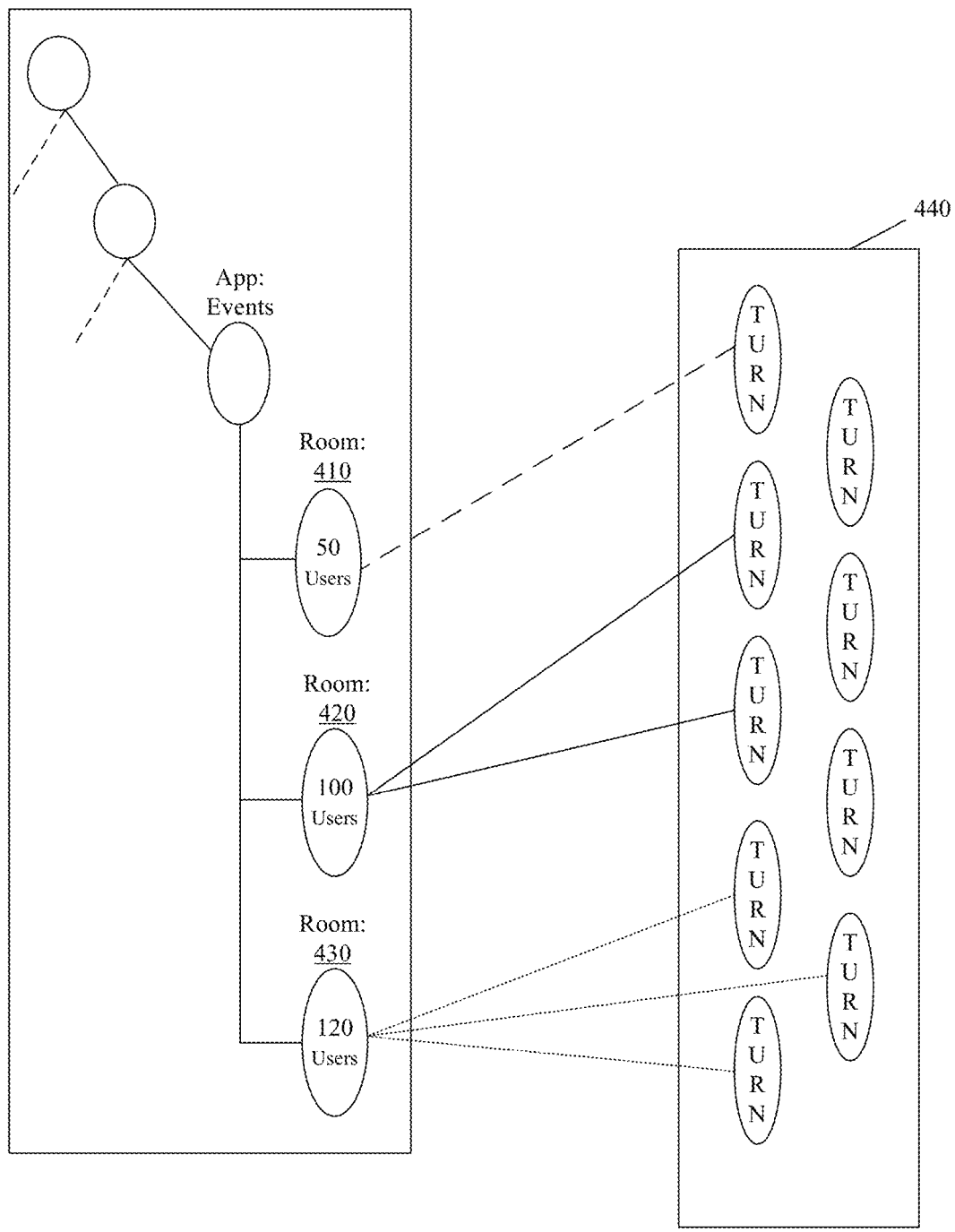
FIG. 4 illustrates the RDT automatically linking in accordance with some embodiments requested service nodes based on expected usage identified by the customer.

FIG. 4 illustrates the RDT automatically linking in accordance with some embodiments requested service nodes based on expected usage identified by the customer. In FIG. 4, the application node represents a live stream event. The customer requests TURN server services for each of the application rooms 410, 420, and 430. The customer identifies 50 users for room 410, 100 users for room 420, and 120 users for room 430. The RTP knows that each TURN server service instance handles up to 50 users. Accordingly, within the RDT scalability layer 440, the RDT links one TURN server service node to room 410, two TURN server service nodes to room 420, and three TURN server service nodes to room 430.

Each service node linkage then triggers the instantiation of an actual TURN server. Instantiating the TURN server services for room 430 involves the RDT deploying the container packaging the TURN server software image to three different sets of resources in order to instantiate three TURN servers that are dedicated and customized for implementing the specific instance of the application in room 430. In terms of a live event, the three allocated TURN servers assist different users in accessing the live stream presented in the corresponding application room.

Once the RDT allocates and instantiates a requested service for a particular customer application or application room, the customer can then customize the service. Service customization is achieved by way of controlling or configuring the service. Service control and configuration is explained in greater detail below.

In some embodiments, the service instantiation is time driven irrespective of when the customer defines and customizes the services for an application. As part of the expected usage definition, the customer may specify when an event starts and ends. In such cases, the RDT delays instantiating the services and resources for the event until just before the event start time. This ensures that services and resources are not unnecessarily allocated and do not remain unused. Similarly, at the specified event end time, the RDT may deallocate the event services and resources and reallocate them elsewhere if needed. Thus, for live streaming events and other time specified applications, customers can define the application and the services needed for the application in advance, and the RDT will queue the instantiation of the services until the designated start time.

To further reduce customer effort in deploying their applications through the RDT, FIG. 5 provides an alternative means with which customers can request RDT services for implementing various customer applications and application rooms. In FIG. 5, the customer requests services for the entire domain 510 rather than each individual application or application room created under the domain. Additionally, the customer identifies the aggregate expected usage 520 for all applications created under the customer domain 510 as well as all rooms for all applications under the customer domain 510.

Based on these parameters and as shown at 530, the RDT links the appropriate quantity of requested service nodes under the first tier of the customer branch. The linkages trigger the actual instantiation of the services on cloud operator resources and allocation of the services to the corresponding domain for implementing any of the customer applications or application rooms defined thereunder. Continuing with the TURN server service example, the RDT dedicates and customizes multiple TURN servers for the customer domain. However, unlike in FIG. 3 where different subsets of the TURN servers were dedicated to different rooms, in FIG. 5 all TURN servers are reserved under the customer domain without specific assignment to any application or room. The services can then be reallocated to different customer applications or application rooms as they are needed by shifting the corresponding service node down from the first tier node to the second tier node of the application or the third tier node o the application room where the service identified by the service node is needed. The RDT then configures the service for implementing the application or application room where it is allocated. In other words, the RDT can use any of the services allocated at the first tier for scaling customer applications defined in the second tier and application rooms defined in the third tier dynamically and in real-time as the services are needed and demand for the applications increases.

In either service requesting scenario of FIGS. 3 and 5, the customer is charged for the services that have been allocated to any tier in the customer branch. These services remain dedicated for the customer, but can be reallocated and reconfigured for use in implementing any customer application or application room at no additional cost. Thus, the allocated services are not statically linked to any particular application or application room. Instead, the RDT deallocates services from applications or application rooms where they are no longer needed as a result of a decline in user usage, as a result of the ending or closing of an application or application room, or when a specified end time for an application or application room has been reached. The RDT then reallocates the services to other applications or application rooms of the customers that need additional such services either as a result of increasing demand or new applications or application rooms being instantiated by the customer or reaching a designated start time. In this manner, the RDT frees the customer from having to manage the infrastructure connecting users to its applications. Instead, the customer can focus on how to improve the user experience and better its offerings while the RDT goes about maximizing service usage and minimizing unnecessary service allocation on behalf of the RDT customers. Moreover, the dynamic allocation of services provides cost savings to the customer. By removing extraneous or unused services from applications or application rooms where they are not needed, the RDT eliminates fees associated with services that are allocated but that are unused.

In either service allocation of FIGS. 3 and 5 and to ensure service usage is maximized, the RDT monitors actual demand at each tier of the various customer branches. In some embodiments, each of the deployed services signals back usage statistics to the RDT. Alternatively, the usage statistics can be obtained directly from the customer application rooms, applications, or domains. In some embodiments, demand in a room is determined from the number of users that have accessed or joined that specific room. In some embodiments, demand at the application level is determined from the total number of users that have accessed or joined any of the rooms defined from the application. In some embodiments, demand at the customer level is determined from the total number of users accessing or joining the various applications offered by the customer. Usage of a service or application by users can be derived from a number of active HyperText Transfer Protocol (HTTP) connections or sessions to the service or application, number of unique Internet Protocol (IP) addresses that access the service or application, number of packets or aggregate byte count passing through the various instantiated services for an application or application room, or by the number of user requests received by the service or application. The RDT has a holistic and granular view of demand at all times. Based on these views, the RDT dynamically and in real-time reallocates and scales the services where they are needed.

Figure 6:
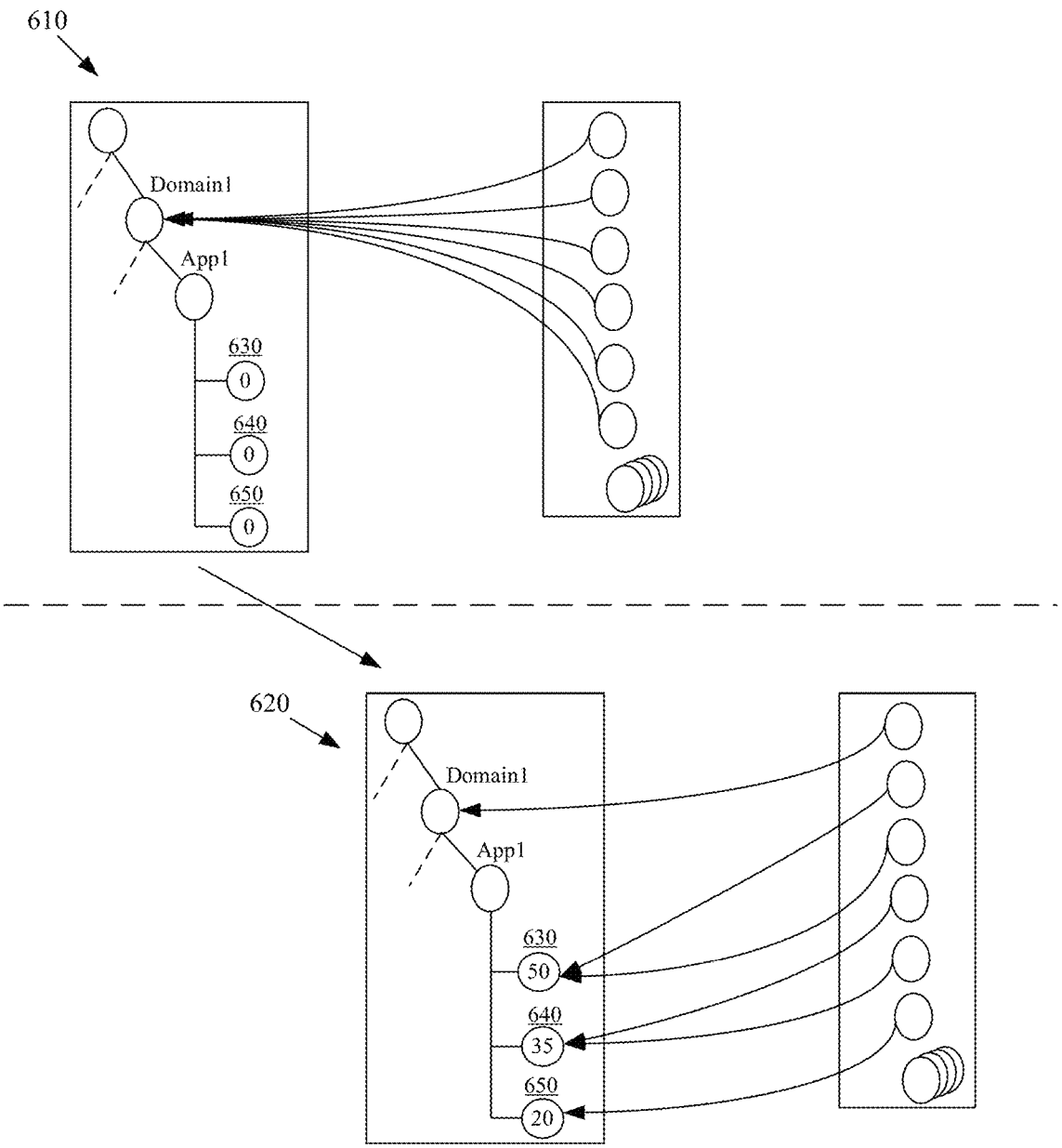
FIG. 6 illustrates how services allocated to a domain as in FIG. 5 are automatically and dynamically relinked to the lower customer branch tiers as actual demand in each of the lower tiers increases in accordance with some embodiments.

FIG. 6 illustrates how services allocated to a domain as in FIG. 5 are automatically and dynamically linked to the lower customer branch tiers as actual demand in each of the lower tiers increases in accordance with some embodiments. Initially at 610, the RDT allocates six service nodes to the first tier of the customer branch based on the expected aggregate usage identified by the customer.

The RDT begins monitoring user access and usage of the various applications and application rooms under the first tier domain of the customer branch. The RDT determines that 50 users have accessed room 630, 35 users have accessed room 640, and 20 users have accessed room 650. In this example, each service represented by one of the allocated service nodes handles up to 25 users.

To ensure that sufficient services have been allocated to each room 630, 640, and 650, the RDT first checks to see if any service nodes have already been linked to rooms 630, 640, and 650. In this case, no services have been linked to any of the rooms 630, 640, 650. Accordingly, the RDT moves up one tier in the customer branch to the application second tier to seek out free service nodes. At the application second tier there are also no available service nodes. Once again, the RDT moves up another tier to the first tier in search of free service nodes. As noted above, the initial allocation based on expected usage has six service nodes allocated at the first tier. At 620, the RDT shows the relinking of services from the service nodes of the first tier to the different application rooms 630, 640, and 650 based on actual demand. Specifically, the RDT links two service instances to room 630, two service instances to room 640, and one service instance to room 650 with one unused service instance remaining linked at the first tier in case additional services have to be allocated to any of the rooms. In some embodiments, linking a service instance involves reallocating and customizing the service and the resources that implement the service to the application instance represented by the application room node where the service is needed.

As can be seen, the RDT takes a hierarchical approach to service scaling. When services in a particular room or third tier are exceeded, the RDT queries the next higher tier (i.e., application tier) for unused services that can be used to scale the service in the lower level. If no services are available at the application tier, the RDT then queries the domain tier in the customer branch for unused services that can be used to scale the services of lower tiers. When there are no available services at the domain level, the RDT may allocate additional service nodes from the RDT root to the domain and then link the corresponding services of the allocated service nodes down the customer branch to where they are needed. Doing so however may come at additional cost to the customer as these services have been allocated in addition to services that had already been requested by the customer.

Service linking can also operate in reverse. Services that go unused or are extraneous for demand in a particular application room are deallocated from that particular application room and relinked to nodes at either the application or domain tiers. This makes the services available for other applications or rooms under the same domain where demand exceeds the services that have been allocated for those other applications or rooms. Service deallocation occurs whenever an application ends, is offboarded, or a designated stop time is reached. Such applications have no users or have ceased to function. Service deallocation also occurs when a usage threshold for a particular service is no longer exceeded by demand for a particular application or application room. For example, a room may at some time be allocated with two instances of the same service. Demand in the room for the services gradually declines to a point in which only one instance of the service is sufficient to meet the demand. The RDT then deallocates one instance of the service and moves the corresponding service node representing the deallocated service up one or more tiers in the customer branch so that the service instance may be reassigned where needed.

The dynamic reallocation is extremely beneficial for streaming or live events. Usage of these events ramps up quickly, therefore requiring service and resource scaling and allocation of several instances of the same service. However, as soon as the event ends or is about to end, most users, if not all users, leave the event, leaving the services and corresponding resources unused and available for allocation to the next event. The RDT identifies the unused services that are available for reassignment by linking them back to the domain tier.

Figure 7:
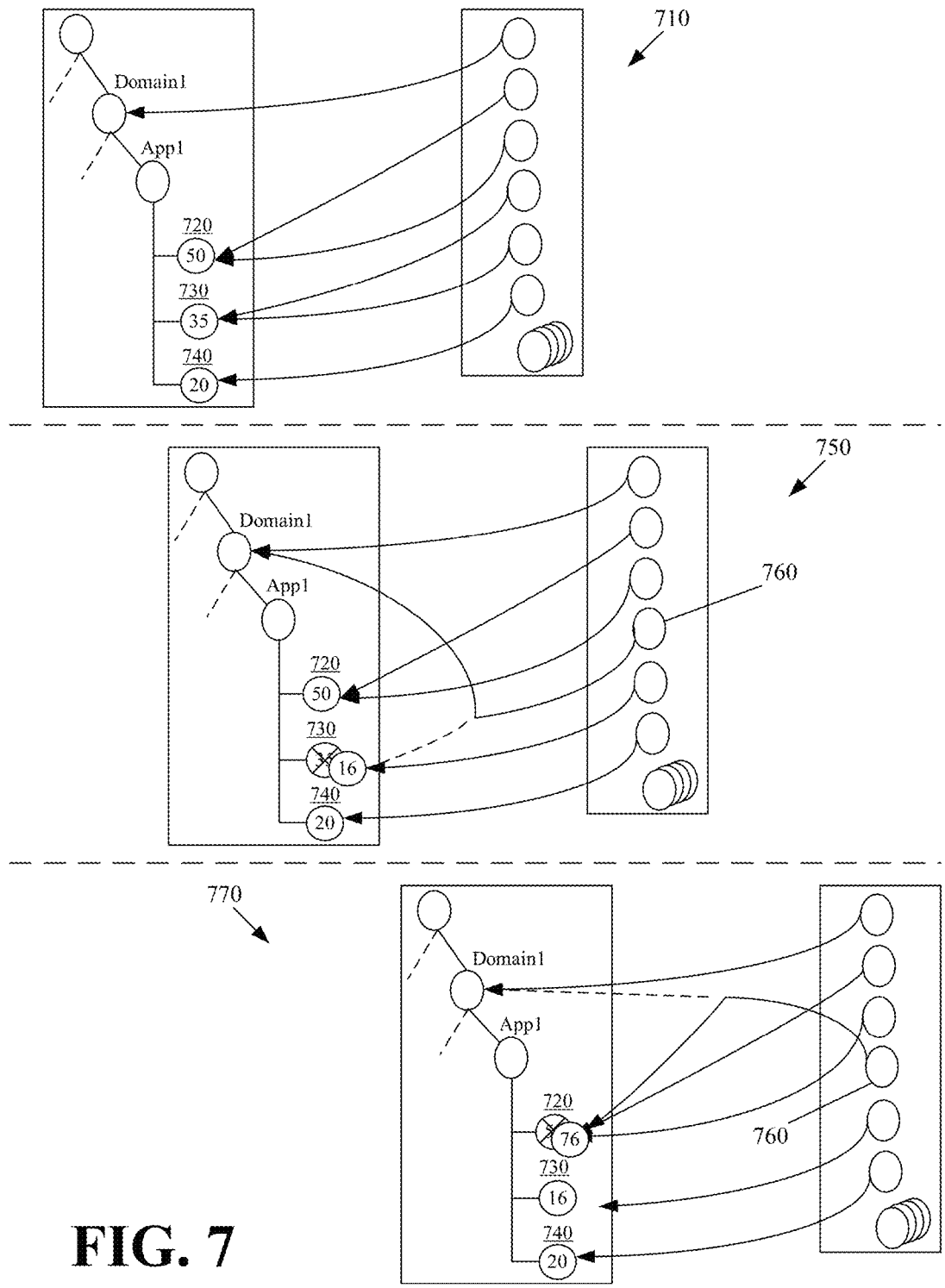
FIG. 7 conceptually illustrates the deallocation and reallocation of a service node from one application room to another in accordance with some embodiments.

FIG. 7 conceptually illustrates the deallocation and relinking of a service node from one application room to another in accordance with some embodiments. The figure illustrates an initial state 710 of a customer branch in the RDT in which service nodes are allocated to different application rooms 720, 730, and 740 based on expected usage identified by the customer or actual real-time user usage. The service nodes identify the services that have been allocated and used in implementing different instances of the customer application.

At 750, the figure illustrates that user demand for services of room 730 has declined to a point in which one of the allocated services is now superfluous. Accordingly, the RDT deallocates service node 760 from application room 730. In deallocating the service from room 730, the RDT relinks the corresponding service node 760 from the room tier to the domain tier, although the service node 760 could also be moved to the application tier.

At 770, the figure shows usage in room 720 has increased to the point that it exceeds a usage threshold for the services allocated to that room 720. Accordingly, the RDT relinks the service represented by the freed service node 760 originally allocated to room 730 over from the domain tier to room 720, thereby dedicating the corresponding service for implementing the application instance associated with the second room 750.

To ensure service availability and scalability, the RDT compiles available and unallocated resources from multiple different cloud operators. This provides the RDT a pool of virtually unlimited resources over which a virtually unlimited number of services can execute. In some embodiments, the RDT requests cloud operator resources on-demand as each new service is deployed for a customer, customer application, or application room. In some other embodiments, the RDT reserves a set of cloud operator resources. The RDT then repurposes the cloud operator resources for execution of different services as those services are deployed and allocated for the implementation of different customers, customer applications, and application rooms.

Due to cost, reliability, and performance variations on the cloud operator resources, some embodiments qualify the services using one or more of these metrics. The metrics help differentiate services that may otherwise appear homogenous. For example, TURN server services offered by the RDT may be deployed and executed on resources of two different cloud operators. Although the two TURN servers provide similar functionality, executing the TURN server service on resources of the first cloud operator can be cheaper than executing the TURN server service on resources of the second cloud operator. Similarly, the TURN server service may have better performance when executing on resources of the first cloud operator than when executing on resources of the second cloud operator. The qualifications provide the RDT as well as the RDT customers with greater control over cost, reliability, and performance parameters, and in turn provide differentiation for the same service.

Performance variations can be due to the strength of the underlying resource (e.g., a faster processor or greater bandwidth). Performance variations are also due largely in part to the geographic location of those resources. When a service executes over a first set of resources that are more proximally located to users using the service than a second set of resources, the users are able to more quickly access the service as a result of the fewer network hops that are traversed in reaching the first set of resources executing the service. This translates to reduced service latency as each additional network hop traversed typically increases latency for a user receiving the service. Fewer network hops also means that there are fewer potential points of service failure, thereby increasing reliability while reducing packet loss. Lastly, fewer network hops means there are fewer potential network obstructions, such as firewalls, and misconfigurations that could block users from accessing the service.

Accordingly, some embodiments further qualify services on the basis of geographic location when the services are tied to and execute using resources located in specific regions. In some embodiments, services qualified to a particular geographic region are clustered together. This makes it easier for a customer to request services that are geographically optimized.

Figure 8:
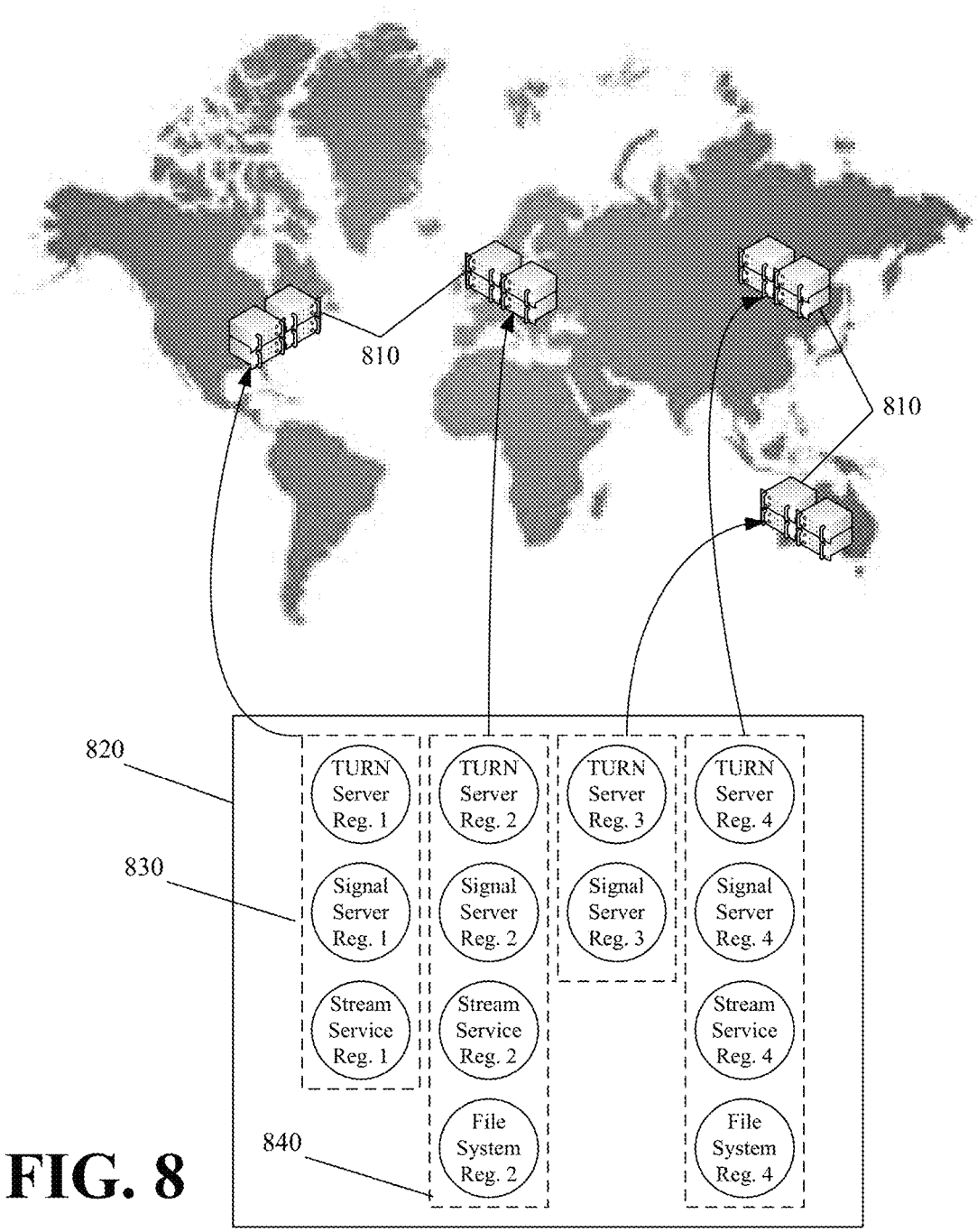
FIG. 8 illustrates qualifying service nodes on the basis of geographic location in accordance with some embodiments.

FIG. 8 illustrates qualifying service nodes on the basis of geographic location in accordance with some embodiments. FIG. 8 illustrates geographically distributed resources 810 operated by different cloud operators. The figure further illustrates different service nodes in the RDT service layer 820, whereby each service represented by one of the service nodes is deployed over a set of resources located in particular geographic region. This is not to say that the service must execute on only one set of resources, but that the RDT deploys the service to run on any available cloud operator resources within a designated geographic region.

In FIG. 8, service node cluster 830 represents services running on resources located in North America (i.e., a first region) such that the services in cluster 830 are optimized for users accessing and interacting with the services from within North America. Service node cluster 840 represents services running on resources located in Europe (i.e., a second region) such that the services in cluster 840 are optimized for users accessing and interacting with the services from within Europe. It should be apparent that the clusters can be defined more granularly to qualify services on the basis of Autonomous System (AS) number, IP address block, nation, zip code, or geographic coordinate identifiers as some examples.

This clustering allows a customer to request an RDT service and also identify the geographic region from which a majority of users are expected to access the service. In response, the RDT allocates the service from the cluster optimally serving that geographic region.

In some embodiments, the different RDT services are packaged in containers. The containers are stored in an RDT service store. The RDT service store is a repository from which service images stored in the containers can easily and rapidly be deployed to cloud operator resources in order to instantiate working instances of the services on the resources.

In some embodiments, a container includes the code, runtime, system tools, and system libraries of a given service. Each container need not include an operating system image. Instead, the container software can be deployed to run over a host operating system that is already installed and running on resources used to execute the service. In some embodiments, the services run as isolated processes in userspace on the host operating system. This greatly simplifies service deployment and allows multiple services to run on the same set of resources. In some embodiments, the container images are not tied to any specific infrastructure such that the service software images can run on infrastructure of any cloud operator.

Each container may include metadata. The metadata can be used to define a minimum set of resources over which the container service executes. For example, a given service may require a minimum amount of allocated memory, processor, and network bandwidth to function properly. The metadata assists the RDT in allocating the correct resources for the given service.

In some embodiments, the containers include or are derived from containers of the Docker containerization technology. This is merely one example of a container that can be used in deploying RDT services. The RDT can seamlessly adapt to use other container technologies for the deployment of services and service software images for execution over resources of different cloud operators.

When a service node is linked to any of a first tier node, second tier node, or third tier node of the RDT, the RDT allocates some set of resources from the available pool of cloud operator resources to execute the service represented by the linked service node. In some embodiments, the amount of allocated resources can be set for a service (i.e., minimum resource set) or can be dynamically allocated based on an expected usage of the service. Once resources have been allocated, the RDT deploys the container packaging the service software to the allocated resources. Deployment involves installing the service software on the allocated resources and beginning execution of the services with the allocated resources. In some embodiments, service deployment also involves customizing the service for implementation of part or all of a particular customer application function or application room function.

In some embodiments, the customer deploys its own software (e.g., code, scripts, interfaces, etc.) atop the service. The RDT provides various interfaces or APIs that allow the customer software to be added atop any services deployed by the RDT on the customer behalf. The customer software can interact with the underlying service via function or API calls. In fact, the customer software can control the service operation through the function or API calls. Service documentation provided by the RDT to the customer exposes the various calls, commands, and variables allowing communication between the RDT services and customer software.

In some embodiments, services can also be customized by configuring various exposed parameters of the services. The parameters can be configured prior to installing the software on the resources or after installation thereon. A customer can directly configure the service parameter using RDT interfaces or APIs. In some embodiments, the customer enters configuration parameters for one or more requested services in a configuration file. The customer uploads the configuration file to the RDT where it is stored under the customer branch. Thereafter, when the RDT deploys a service to a particular customer application, the RDT scans the configuration file to identify customer specified configuration parameters for the service implementing the particular customer application. The RDT then automatically configures the service according to the customer specified configuration parameters.

In some embodiments, the customer specified configuration file or configuration parameters can be stored to the RDT data layer. In some such embodiments, a data layer node storing customer provided configuration parameters is linked to an application node or application room node of the RDT.

III. RDT Protocol Layer

The protocol layer can be used to scale and adapt signaling and messaging of RDT services and customer applications. By adapting the signaling and messaging, the protocol layer can be used to control inter-service dependencies and the manner with which users access or engage with the services that implement various customer applications. In some embodiments, the protocol layer links customer applications and/or the services implementing the applications to the data layer. Here, the protocol layer is used to track service activity occurring anywhere within the RDT.

The protocol layer can adapt service or application signaling and messaging in different ways. The adaptation occurs whenever one or more protocol layer nodes are linked to a customer application node or directly to a service node implementing a customer application.

One adaptation involves changing service messaging and connection formats. In some embodiments, the protocol layer can adapt messaging of a particular service for either connectionless passage or connection-oriented passage. In so doing, any RDT service can be optimized via different protocol layer nodes for implementation of a time-sensitive customer application or for implementation of a customer application where reliability is paramount. For instance, a first protocol layer node linked to a particular service node encapsulates messaging produced from the corresponding service as User Datagram Protocol (UDP) packets that are then sent to the intended destination using UDP. A different second protocol layer node linked to the particular service node can instead encapsulate the service messaging as Transmission Control Protocol (TCP) packets that are then sent to the intended destination using TCP. The protocol layer nodes could also be linked to the particular application node. This linkage adapts all messaging from the particular application for either connection-oriented or connectionless transmission as determined by the protocol layer node that is linked to the particular application node.

In some embodiments, the protocol layer changes service messaging and connection format by adding encryption support to service communications. In some such embodiments, a protocol layer node linked to a particular service node causes all communications between the service identified by the particular service node and other services and users to be encrypted.

The protocol layer can also adapt service or application messaging and connection formats for security reasons. The protocol layer can be used to restrict the kinds of messages that a service accepts as input or the content of the messages. For example, the protocol layer can define various filters or signatures to detect and block malicious traffic.

As noted above, the protocol layer can also be used to establish inter-service dependencies. The protocol layer nodes can be linked to different service nodes to establish the manner with which the output from one service is fed as input to another service or to a user. In this manner, the protocol layer nodes can define service execution ordering for a customer application. The protocol layer nodes also define the permitted service-to-service communication and service-to-user communication.

The protocol layer nodes can also be used in some embodiments to expand service reach. In some such embodiments, the protocol layer nodes, when linked to the service nodes, enable the corresponding services to communicate with different devices. For example, the RDT may link multiple protocol layer nodes to a particular service node in order to enable the corresponding service identified by the service node to accept messaging from mobile devices, personal computers, and Internet-of-Things (IoT) devices. In such cases, the protocol layer nodes can be used to define the messaging format for input to and output from a particular service. The protocol layer nodes can also be used to expand the ports or websockets over which a service listens and communicates.

Figure 9:
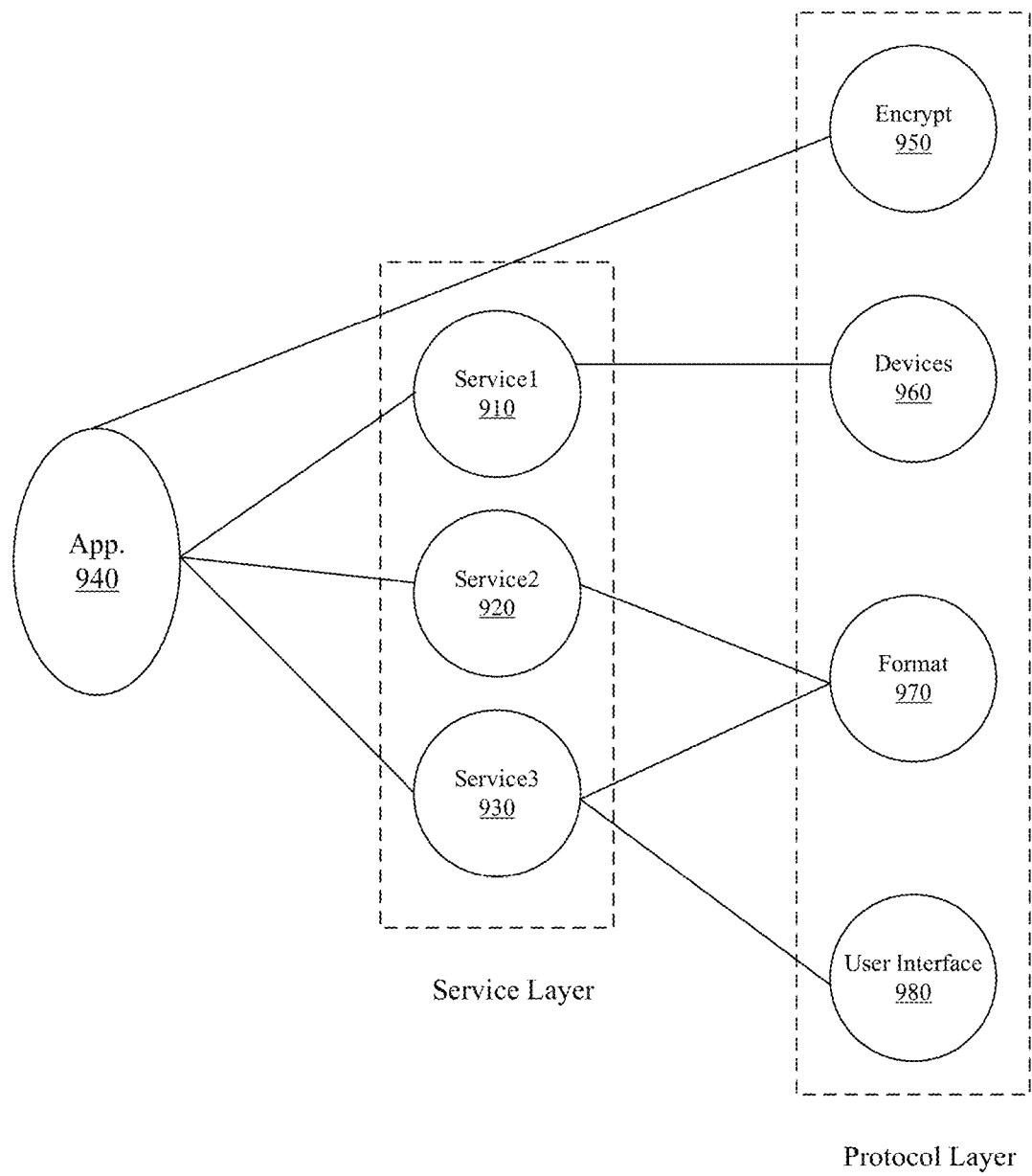
FIG. 9 illustrates using protocol layer nodes to adapt service signaling and messaging in accordance with some embodiments.
Figure 10:
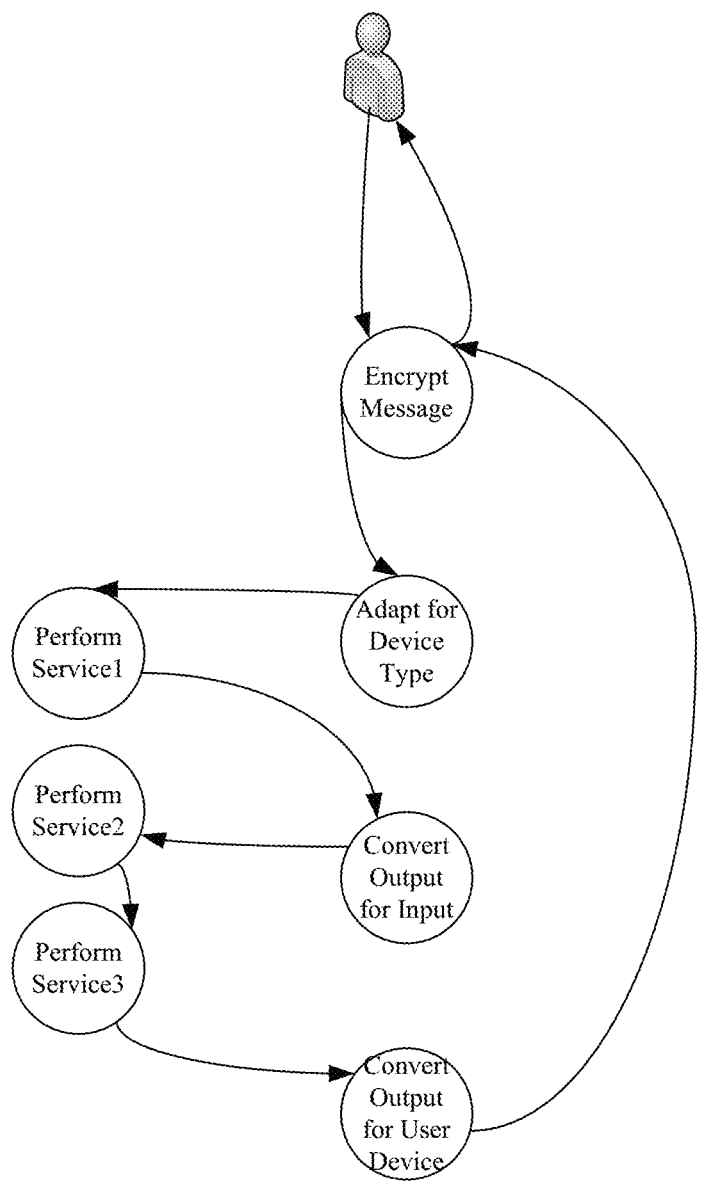
FIG. 10 conceptually illustrates execution flow for the customer application defined according to the service nodes and protocol layer nodes of FIG. 9.

FIG. 9 illustrates using protocol layer nodes to adapt service signaling and messaging in accordance with some embodiments. In this figure, three service nodes 910, 920, and 930 are linked to a particular customer application node 940. The three service nodes 910-930 identify the various services that implement the customer application represented by the particular customer application node 940. A first encryption protocol layer node 950 is linked to the particular customer application node 940 causing all communications between the customer application and users to be encrypted. A second protocol layer node 960 links to the first service node 910 to enable connections with a variety of different user devices. A third protocol layer node 970 links the first service node 910 to the second service node 920 in order to adapt the messaging that is output from the first service for input to the second service. Finally, a fourth protocol layer node 980 links to the third service node 930 to define the manner in which output from the third service is passed to a particular application user. FIG. 10 conceptually illustrates execution flow for the customer application defined according to the service nodes and protocol layer nodes of FIG. 9.

In some embodiments, the protocol layer nodes link the service layer to the data layer. These links define the service activity the RDT tracks and stores to the data layer. The protocol layer nodes could also establish links between nodes of a customer branch and the data layer. These links define the domain, application, or application room activity that the RDT tracks and stores to the data layer. In this manner, the protocol layer links determine what information is stored to the data layer.

Figure 11:
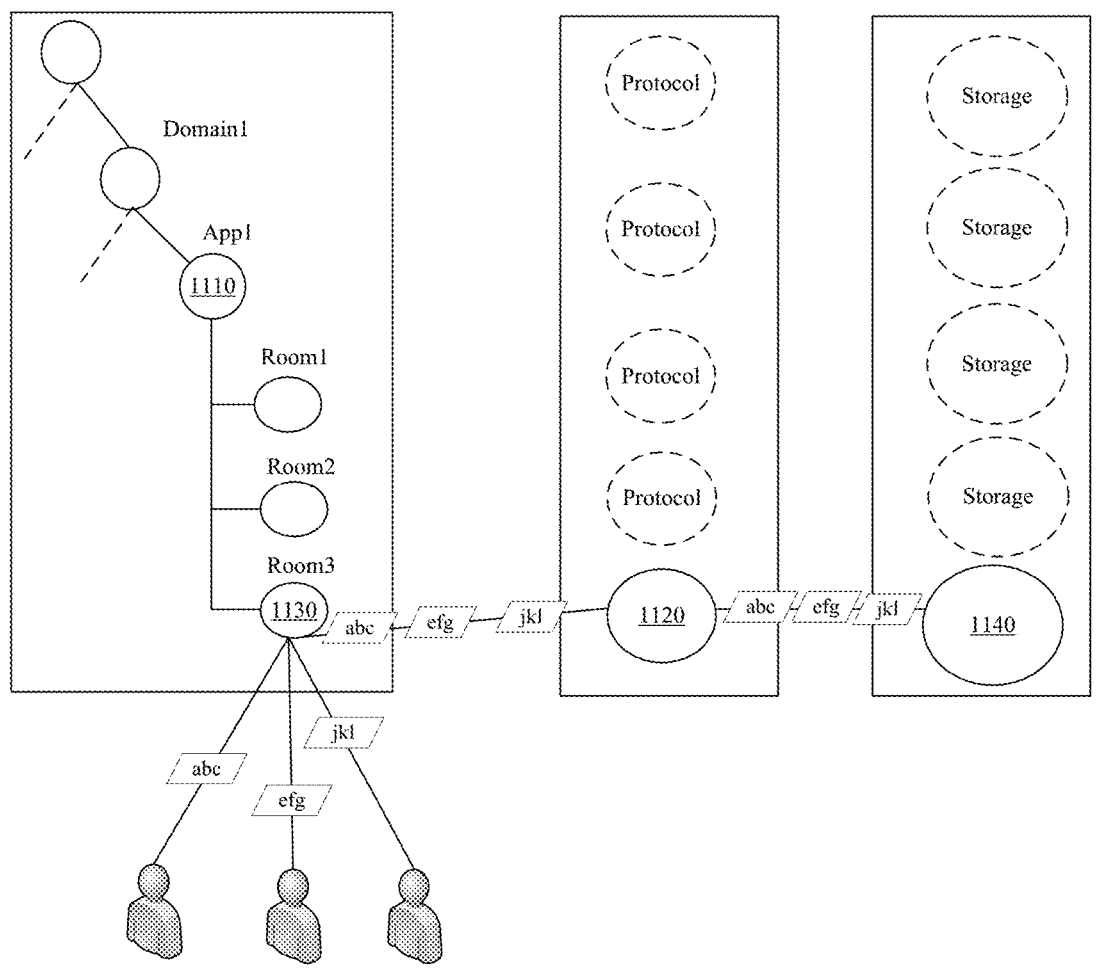
FIG. 11 illustrates defining a link between a customer application room and the data layer in accordance with some embodiments.

In accordance with some embodiments, FIG. 11 illustrates defining a link between a customer application room and the data layer. In this figure, a customer has defined an RDT branch with an application node 1110 representing a chat application created by the customer. The application node 1110 has multiple application room nodes connected to it. Each room node represents a chat room with different sets of users. A protocol layer node 1120 links the third room node 1130 to the data layer. This link causes the RDT to record all chat activity occurring in the third room 1130 to a specific data layer node 1140 representing storage that is specifically dedicated to that chat room 1130.

IV. RDT Data Layer

The RDT data layer can be used to track activity occurring at any node within the tree structure. Accordingly, the data layer can track and store activity in conjunction with any customer domain, customer application, or customer application. The data layer can also track and store activity in conjunction with any service that is deployed on behalf of a customer. As noted above, the protocol layer can be used to define what activity is to be recorded by linking various nodes of the customer branch or service nodes to the data layer.

In some embodiments, the data layer tracks designated activity across four dimensions. The four dimensions provide an efficient storage and retrieval mechanism as well as non-destructive storage of the activity. All historic activity can be tracked without being overwritten even as values for the same tracked variables change over time or change throughout the duration of a service. In some embodiments, the data layer, via the four-dimensional storage, can be used to record chat sessions, meetings, and other such user interactions or communications.

The four-dimensional storage expands on traditional key value stores by adding two additional dimensions by which activity is tracked. In some embodiments, the four-dimensional storage records activity across path, key, layer, and time dimensions.

The first dimension identifies a tree path. The path identifies the domain or customer, service or application, and room where the activity occurs. The path also identifies the location where the activity should be stored or retrieved from.

The second dimension is the key for the storage key-value pair. The key represents a data instance or variable. The second dimension allows customers to target and record specific activity generated from a service.

The third dimension introduces layers. The layers allow the targeted activity to be indexed. In other words, the layers can be used to assign different values to the same data instance or variable. By default, all activity is stored to a default layer. However, an arbitrary number of layers can be specified in order to track additional activity or values to the same key-value pair. For example, a first layer can be used to record a first value that a first service produces for a particular data variable and a second layer can be used to record a second value that a different second service produces for the same particular data variable. The layers also allow targeted activity to be indexed. In other words, the layers can be used to assign different values to the same data instance or variable. By default, all activity is stored to a default layer. However, an arbitrary number of layers can be specified in order to track additional activity or values to the same key-value pair.

The fourth dimension introduces time as part of storage. The time element allows a specific data instance or variable to have multiple different values at different points of time. Therefore, as data changes, the previous history for that data is preserved such that it is still accessible. For example, a command such as node.time_series(path, key, layer: "mylayer") returns a list of values that the identified key at the path had at different recorded times. Each value is presented with a timestamp to indicate when the key had the identified value. Such four-dimensional storage is useful to track chat history between users in a given room as one example.

These four dimensions provide full customizability in what data is tracked and stored and how it is retained. Such storage can be added to any node of the RDT. When added to a particular node, storage can be configured for all activity at that particular node and optionally, any sub-nodes branching from the particular node.

V. Computer System/Resources

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 12:
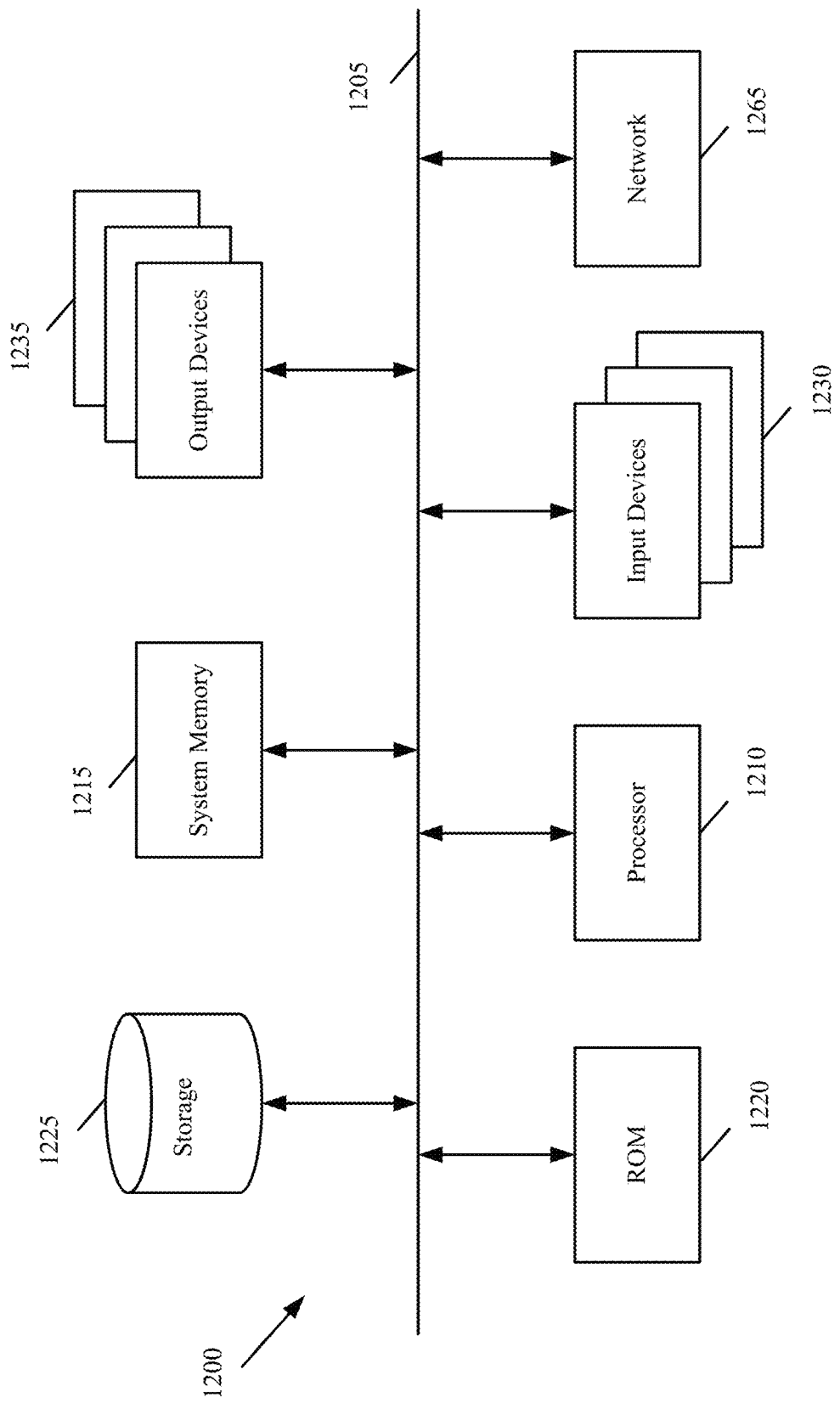
FIG. 12 illustrates a computer system or server with which some embodiments are implemented.

FIG. 12 illustrates a computer system or server with which some embodiments are implemented. Such a computer system includes various types of computer-readable mediums and interfaces for various other types of computer-readable mediums that implement the various methods and machines, including the RDT described above. The computer system of FIG. 12 also illustrates various resources on which the services described above execute. Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225. From these various memory units, the processor 1210 retrieves instructions to execute and data to process in order to execute the processes of the invention. The processor 1210 is a processing device such as a central processing unit, integrated circuit, graphical processing unit, etc.

The read-only-memory (ROM) 1220 stores static data and instructions that are needed by the processor 1210 and other modules of the computer system. The permanent storage device 1225, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1225.

Other embodiments use a removable storage device (such as a flash drive) as the permanent storage device Like the permanent storage device 1225, the system memory 1215 is a read-and-write memory device. However, unlike storage device 1225, the system memory is a volatile read-and-write memory, such as random access memory (RAM). The system memory stores some of the instructions and data that the processor needs at runtime. In some embodiments, the processes are stored in the system memory 1215, the permanent storage device 1225, and/or the read-only memory 1220.

The bus 1205 also connects to the input and output devices 1230 and 1235. The input devices enable the user to communicate information and select commands to the computer system. The input devices 1230 include alphanumeric keypads (including physical keyboards and touchscreen keyboards), pointing devices. The input devices 1230 also include audio input devices (e.g., microphones, MIDI musical instruments, etc.). The output devices 1235 display images generated by the computer system. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 1200 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
reconfigurably allocating a plurality of services across a plurality of cloud computing resources in dynamically implementing a plurality of applications, each service of the plurality of services executing different functionality using one or more cloud computing resources of the plurality of cloud computing resources;

reconfigurably linking a plurality of protocols to the plurality of services, each particular protocol of the plurality of protocols modifying signaling or messaging of at least one service linking to the particular protocol, the plurality of protocols comprising one or more of a first protocol encrypting messaging produced from a service of the plurality of services linked to the first protocol, a second protocol converting messaging in a first format produced from a service of the plurality of services linked to the second protocol to a different second format, and a third protocol communicably coupling a service of the plurality of services linked to the third protocol to a plurality of different user devices;

receiving from a particular customer over an online interface, input comprising (i) a first set of the plurality of services and a first set of the plurality of protocols used in implementing a first application and (ii) an expected usage of the first application by users;

determining a quantity of each of the first set services used in implementing the first application based on the expected usage;

generating in response to said input from the online interface by operation of a computer processor, a tree structure defining the first application implementation, the tree structure comprising a first layer with a branch having a first node identifying a domain of the particular customer and a second node identifying the first application, a second layer with a set of service nodes linked to the second node in the first layer, and a third layer with a set of protocol nodes linked to the set of service nodes in the second layer, wherein the set of services nodes represent the first set of services allocated to the first application and the set of protocol nodes represent the first set of protocols allocated to the first application based on said input and said quantity; and implementing the first application according to said tree structure, wherein said implementing comprises (i) provisioning a set of the plurality of cloud computing resources for said first application, (ii) executing said quantity of the first set of services on behalf of the particular customer across the set of cloud computing resources, and (iii) adapting signaling or messaging of the first application with the first set of the plurality of protocols, wherein adapting said signaling or messaging comprises one or more of (a) encrypting messaging of at least one service of the first set of services in response to the third layer of the tree structure linking a protocol node of the first protocol to a service node of the at least one service in the second layer of the tree structure, (b) converting messaging format of at least one service of the first set of services from an original first protocol format to a different second protocol format in response to the third layer of the tree structure linking a protocol node of the second protocol to a service node of the at least one service in the second layer of the tree structure, and (c) establishing connections between at least one service of the first set of services and a set of devices in response to the third layer of the tree structure linking a protocol node of the third protocol to a service node of the at least one service in the third layer of the tree structure.

2. The method of claim 1 further comprising compiling the plurality of cloud computing resources from a plurality of cloud operators.

3. The method of claim 2, wherein executing said quantity of the first set of services comprises for each instance of a service from the first set of services up to said quantity, deploying said instance on a different subset of the set of cloud computing resources.

4. The method of claim 3, wherein compiling the plurality of cloud computing resources comprises qualifying each resource of the plurality of cloud computing resources based on geographic location where the resource operates, and wherein executing the first set of services comprises executing each service instance of the first set of services using the set of the plurality of cloud computing resources that is geographically proximate to a set of users using said service instance.

5. The method of claim 1 further comprising monitoring usage of the first application.

6. The method of claim 5 further comprising receiving from the particular customer, second input comprising a second set of the plurality of services and a second set of the plurality of protocols for implementing a second application.

7. The method of claim 6 further comprising deallocating one instance of a particular service from the first set of services of the first application in response to usage of the first application being less than a minimum usage threshold while the first application continues execution with a remainder of services from the first set of services.

8. The method of claim 7 further comprising reallocating said instance of the particular service from the first application to the second application, wherein said reallocating comprises executing the particular service as part of the second application and not the first application.

9. The method of claim 5 further comprising scaling the first application without involvement of the particular customer in response to usage of the first application exceeding a maximum usage threshold.

10. The method of claim 9, wherein scaling the first application comprises provisioning additional instances of the first set of services and executing said additional instances in connection with said quantity of the first set of services.

11. The method of claim 1 further comprising moving linkage of a particular service node from the second layer to the first layer, wherein moving said linkage deallocates a particular service associated with the particular service node from the first application such that the particular service does not execute as part of the first application.

12. The method of claim 1 further comprising moving linkage of a particular service node from the second node in the first layer to a third node in the first layer, wherein the third node identifies a second application of the particular customer, and wherein moving said linkage comprises reallocating a particular service associated with the particular service node from the first application to the second application.

13. The method of claim 1 further comprising linking a particular service from the first set of services to a particular protocol of the first set of protocols, wherein said linking comprises adapting signaling or messaging of the particular service to the particular protocol.

14. The method of claim 1 further comprising linking a storage node to a particular service of the first set of services, wherein said linking comprises tracking activity from the particular service to the storage node.

15. The method of claim 1, wherein said implementing further comprises tracking activity of the first set of services across four dimensions.

16. The method of claim 15, wherein tracking activity across four dimensions comprises tracking activity of the first set of services across path, key, layer, and time dimensions.

17. The method of claim 1, wherein the plurality of services comprises one or more of a first service instantiating a traversal using relays around network address translator (TURN) server on a set of the plurality of cloud computing resources allocated to the first service, a second service instantiating a session traversal of User Datagram Protocol (STUN) server on a set of the plurality of cloud computing resources allocated to the second service, and a third service instantiating a signaling server on a set of the plurality of cloud computing resources allocated to the third service.

18. The method of claim 17, wherein said executing comprises providing at least one of a chat, streaming, meeting, or collaboration application as the first application by instantiating one or more of said TURN server, STUN server, or the signaling server across the set of cloud computing resources in response to said quantity of a particular service of the first set of services.

19. The method of claim 1, wherein reconfigurably allocating the plurality of services comprises executing the first application with a particular service from the first set of services during a first interval, reallocating the particular service from the first application to a second application, and executing the second application with the particular service during a different non-overlapping second interval.

\* \* \* \* \*